US008174540B1

(12) United States Patent
McLernon et al.

(10) Patent No.: US 8,174,540 B1
(45) Date of Patent: May 8, 2012

(54) CONSISTENCY CHECKING OF USER-SETTABLE ISOLATED PARAMETERS IN A GRAPHICAL MODEL

(75) Inventors: Michael H. McLernon, Attleboro, MA (US); Martin Clark, Boston, MA (US)

(73) Assignee: The MathWorks, Inc., Natick, MA (US)

( * ) Notice: Subject to any disclaimer, the term of this patent is extended or adjusted under 35 U.S.C. 154(b) by 1194 days.

(21) Appl. No.: 11/901,149

(22) Filed: Sep. 14, 2007

(51) Int. Cl.
  *G09G 5/00* (2006.01)
  *G06T 11/20* (2006.01)
(52) U.S. Cl. .................. 345/619; 345/440; 345/440.1
(58) Field of Classification Search .......... 345/619, 345/440, 440.1, 418
See application file for complete search history.

(56) References Cited

U.S. PATENT DOCUMENTS

| 6,750,864 B1 * | 6/2004 | Anwar | 345/440 |
| 2003/0117417 A1 * | 6/2003 | Lee | 345/619 |

* cited by examiner

*Primary Examiner* — Chante Harrison
(74) *Attorney, Agent, or Firm* — Nelson Mullins Riley & Scarborough LLP

(57) ABSTRACT

In one embodiment, a method for checking consistency of user-settable isolated parameters among a first graphical modeling component and a second graphical modeling component in an executable graphical model is provided. The method includes designating that the first graphical modeling component and the second graphical modeling component are related; checking consistency between a first user-settable isolated parameter of the first graphical modeling component and a corresponding second user-settable isolated parameter of the second graphical modeling component; and displaying an error when the first user-settable isolated parameter and the corresponding second user-settable isolated parameter are not consistent with each other.

26 Claims, 10 Drawing Sheets

*Error! Phase offset values are not consistent between M-PSK Modulator Baseband block and M-PSK Demodulator Baseband block*

100

CONSISTENCY CHECKING OF USER-SETTABLE ISOLATED PARAMETERS IN A GRAPHICAL MODEL

BACKGROUND OF THE INVENTION

In graphical models, many graphical modeling components may have user-settable parameters. For example, a graphical modulator component may have a user-settable parameter that specifies the data type of the output that has been modulated. In some models, user settable parameters, such as the modulator parameter above, may need to be consistent with parameters of other model components, such as a demodulator component. In certain situations the demodulator may both have user settable parameters and a user may need to make sure these parameters are consistent with each other so that an output data type from the modulator matches an input data type for the demodulator. Additionally, users may wish to make sure operations performed on an input are consistent with the operations as performed by the related component. Users may have difficulty keeping track of user-settable parameters among model components, especially when a model includes a large number of components.

SUMMARY OF THE INVENTION

In one embodiment, a method for checking consistency of user-settable isolated parameters among a first graphical modeling component and a second graphical modeling component in an executable graphical model is provided. The method includes receiving a user designation at the model component level that the first graphical modeling component and the second graphical modeling component are related; checking consistency between a first user-settable isolated parameter of the first graphical modeling component and a second user-settable isolated parameter of the second graphical modeling component based on the designating of the first graphical modeling component and the second graphical modeling component as related; and displaying a notification, or storing a determination, of a consistency status of the first user-settable isolated parameter and the second user-settable isolated parameter.

In another embodiment, a computer system for checking consistency of user-settable isolated parameters among graphical modeling components in an executable graphical model is provided. The system includes an executable graphical model including a first graphical modeling component and a second graphical modeling component, wherein the first graphical modeling component and the second graphical modeling component are designated at the model component level by a user as related; a parameter consistency checker that checks consistency between a first user-settable isolated parameter of the first graphical modeling component and a second user-settable isolated parameter of the second graphical modeling component; and an interface that displays a notification of a consistency status or that sends a consistency status notification to a destination or to a storage device.

BRIEF DESCRIPTION OF THE FIGURES

The foregoing and other aspects, features, and advantages of the invention will become more apparent and may be better understood by referring to the following description taken in conjunction with the accompanying drawings, in which.

DETAILED DESCRIPTION

Figure 1:
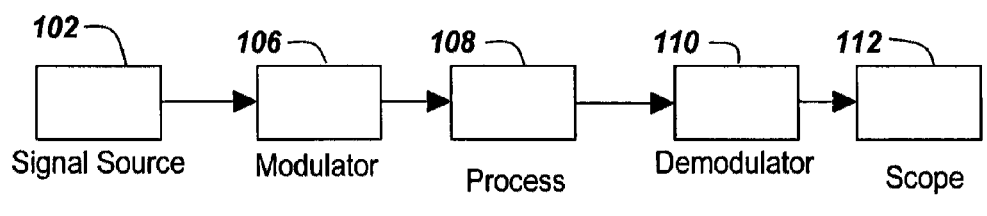
FIG. 1 illustrates an exemplary model that has a modulator and an associated demodulator.

Exemplary embodiments provide automatic consistency checking of user-settable isolated parameters among graphical modeling components in an executable graphical model.

A "user-settable parameter" is used herein to refer to a user settable property, attribute, or a variable of a graphical modeling component, including, but not limited to, complexity, data type, dimension, sample time, and frame rate.

"Consistency" is used herein to refer to a relationship between multiple user-settable parameters. In one embodiment, consistency may mean equal or identical. In other embodiments, consistency may mean constantly greater or smaller than a reference value, quantity, range, etc. In still other embodiments, consistency may mean a relationship that may be described using a mathematical expression. For example, a user-settable parameter may be always equal to or smaller than another user-settable parameter. Consistency may also refer to system settable parameters and/or parameters that are both partially set by a system and a user. Additionally, consistency may refer to a relation of parameter characteristics, such as their type.

"Consistency checking" is used herein to refer to checking whether two or more parameters are consistent with respect to one another as regards a given relationship. In one embodiment, consistency checking may be performed automatically. Consistency checking is performed for parameters that relate to, information that is not shared between modeling components. For example, consistency checking may be performed for non-shared values such as a coefficient value but is not used herein to refer to parameters related by shared information values such as signal connections where a value from the output of one component serves as the input for another component. The parameters related to information that is not shared between modeling components (non-shared values) are referred to herein as "isolated parameters".

Automatic consistency checking may prevent the user from having to verify consistency among user-settable isolated parameters. For example, a model may require that a first user-settable isolated parameter for a first model component be consistent with a second user-settable isolated parameter for a second model component. Exemplary embodiments may automatically determine whether the first isolated parameter is consistent with the second isolated parameter. In contrast, conventional systems may require that the user manually determine whether the first isolated parameter is consistent with the second isolated parameter.

A dependency marker may be provided which allows a user to specify, in a first graphical modeling component, an identity of one or more graphical modeling components(s) that have common user-settable isolated parameters. The dependency marker may identify those user-settable isolated parameters of the graphical modeling component to which a consistency check will be applied. This embodiment may allow these user-settable isolated parameters to be automatically checked for consistency.

Based on the identifications made by the dependency marker, a parameter consistency checker may check the consistency of the user-settable isolated parameters between the graphical modeling component and its associated graphical modeling component(s).

When a user-settable isolated parameter in a graphical modeling component changes, a parameter propagation tool may change the corresponding user-settable isolated parameter in another graphical modeling component so that consistency is maintained between the user-settable isolated parameters. The parameter propagation tool allows consistency checking to be performed across portions of a model (e.g., subsystems) or across models (e.g., a first model and a second model) where the portions of the model or the models can be collocated or distributed across multiple environments. It will be appreciated that other techniques may be employed within the scope of the present invention to maintain consistency between isolated parameters and that propagation is listed only as an exemplary technique.

One type of graphical modeling component is a block diagram component from a block diagram model. Block diagram modeling software includes a number of generic components. It should be appreciated that although some of the discussion contained herein pertains to SIMULINK® software from The MathWorks, Inc. of, Natick Mass., those skilled in the art will recognize that the discussion is also applicable to other block modeling software applications. The generic components in block diagram modeling software include a block diagram editor, blocks and a block diagram execution engine. The block diagram editor allows users to perform such actions as draw, edit, annotate, save, and print out block diagram representations of dynamic systems. Blocks are the fundamental mathematical elements of a classic block diagram model. SIMULINK® software extends the classic block diagram models by introducing the notion of two classes of blocks, non-virtual blocks and virtual blocks. Non-virtual blocks are elementary dynamic systems. A virtual block is provided for graphical organizational convenience and plays no role in the definition of the system of equations described by the block diagram model. Examples of virtual blocks are the Bus Creator virtual block and Bus Selector virtual block which are used to reduce block diagram clutter by managing groups of signals as a "bundle". Virtual blocks may be used to improve the readability of models. SIMULINK® software further extends the meaning of a non-virtual block to include other semantics, such as a "merge" block semantic. The merge block semantic is such that on a given time step its output is equal to the last block to write to an input of the merge block. An additional extension provided by SIMULINK® software is the concept of conditional execution. SIMULINK® software contains the concept of conditional and iterative subsystems that control when in time block methods execute for a sub-section of the overall block diagram.

A block diagram execution engine contributes to the modeling software task of enabling the computation and tracing of a dynamic system's outputs from its block diagram model. An execution engine carries out the task of compiling and linking the block diagram to produce an "in-memory executable" version of the model that is used for generating code and/or simulating or linearizing a block diagram model. Note that simulation of the block diagram may also be referred to as a form of execution. The compile stage involves checking the integrity and validity of the block interconnections in the block diagram. In this stage, the engine also sorts the blocks in the block diagram into hierarchical lists that are used when creating the block method execution lists.

To aid in the understanding of the exemplary embodiments, FIG. 1 illustrates an exemplary graphical model 100 that includes blocks that have user-settable isolated parameters that should be consistent. Model 100 includes a signal source block 102 that provides an input signal to modulator block 106. The modulator block 106 may include a component that receives an input signal at an input port and produces a modulated signal at an output port. The modulator block 106 may have user settable isolated parameters. The output of modulator block 106 can be further processed by process block 108. The process block 108 may include a component that receives an input signal at an input port and produces a processed signal at an output port. The output of process block 108 is provided as the input to demodulator block 110. The demodulator block 110 may include a component that receives an input signal at an input port and produces a demodulated signal at an output port. The demodulator block 110 may have user settable isolated parameters. The output of the demodulator block 110 can then be further processed by scope block 112.

Figure 2A:
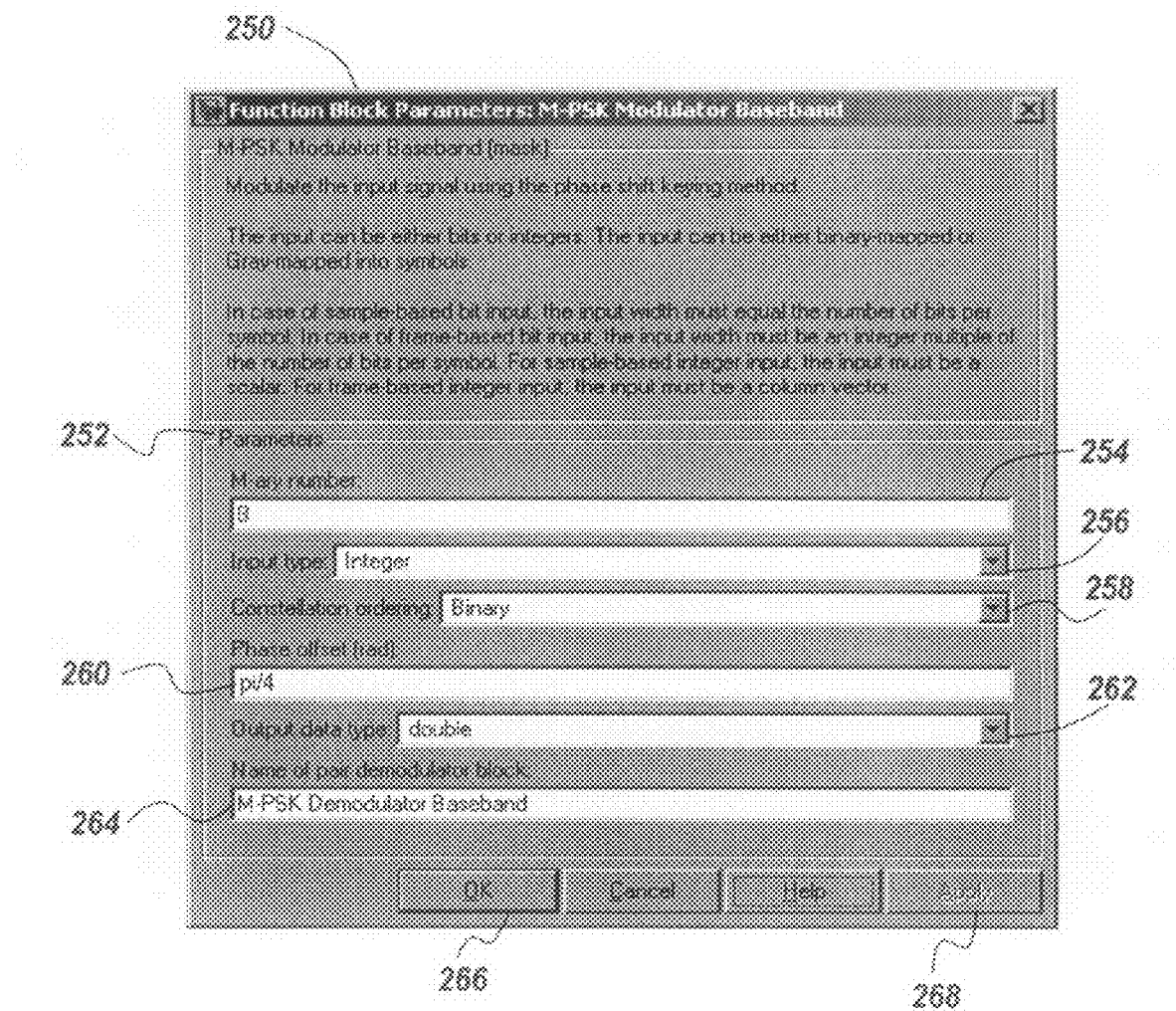
FIG. 2A illustrates an exemplary graphical user interface that may be used to specify an identity of an associated demodulator.

FIG. 2A illustrates exemplary user-settable isolated parameters that may be used for modulator block 106. The demodulator block 110 may also have user-settable isolated parameters. In an embodiment, one or more user-settable isolated parameters of modulator block 106 may need to be consistent with the corresponding one or more user-settable isolated parameters of demodulator block 110 in order to produce a correct model.

The parameters dialog 250 in FIG. 2A allows a user to set a number of the isolated parameters of the modulator block 106. The user-settable isolated parameters are defined in the parameter list 252. Parameter list 252 includes an M-ary number parameter 254 that represents the number of points in a signal constellation, an input type parameter 256 that indicates if the input consists of integers or groups of bits, a constellation ordering parameter 258 that indicates how the block maps groups of bits to a corresponding point in the complex plane, a phase offset parameter 260 that defines the phase of the zeroth point of the signal constellation, and an output data type parameter 262 that specifies the output data type of the modulator block 106.

The parameters dialog 250 also includes a text box 264 in which a user may provide identity information (e.g., a name) for a corresponding demodulator block. In this example, the user has typed in the name of "M-PSK Demodulator Baseband" in the text box 264 as the pair demodulator block (i.e. demodulator block 110). As will be described in more detail below, once the user has entered the name of the pair demodulator block and selected the "OK" button 266 or the "Apply" button 268, the isolated parameters between the modulator block 106 and demodulator block 110 will be checked for consistency. In one embodiment, a user interface (not shown) may be provided to allow a user to specify what isolated parameters are to be consistency-checked between the two graphical modeling components, subsystems, models, etc. The user interface may provide a list of all possible components to which a component may be related in response to selecting a control, such as a 'browse' button on a dialog. The user interface may also allow more than one component to be selected, for example, by the use of a wildcard character or multi-select option. In one embodiment, the user interface may enable the designation of a graphical modeling component that is a block or connection in a block diagram or a state or transition in a state diagram. The user interface may allow the user to specify consistency relations being checked. Alternative ways to set isolated parameters and to identify a corresponding block that requires consistent isolated parameters may be used.

It will be appreciated that although in FIG. 2A parameter values are used as the user-settable isolated parameters that are consistent between two blocks 106 and 110 in a model 100, other user-settable isolated parameters, other kinds of consistencies, other kinds of graphical modeling components, other kinds of models, and/or other kinds of modeling environments, may be used.

Figure 2B:
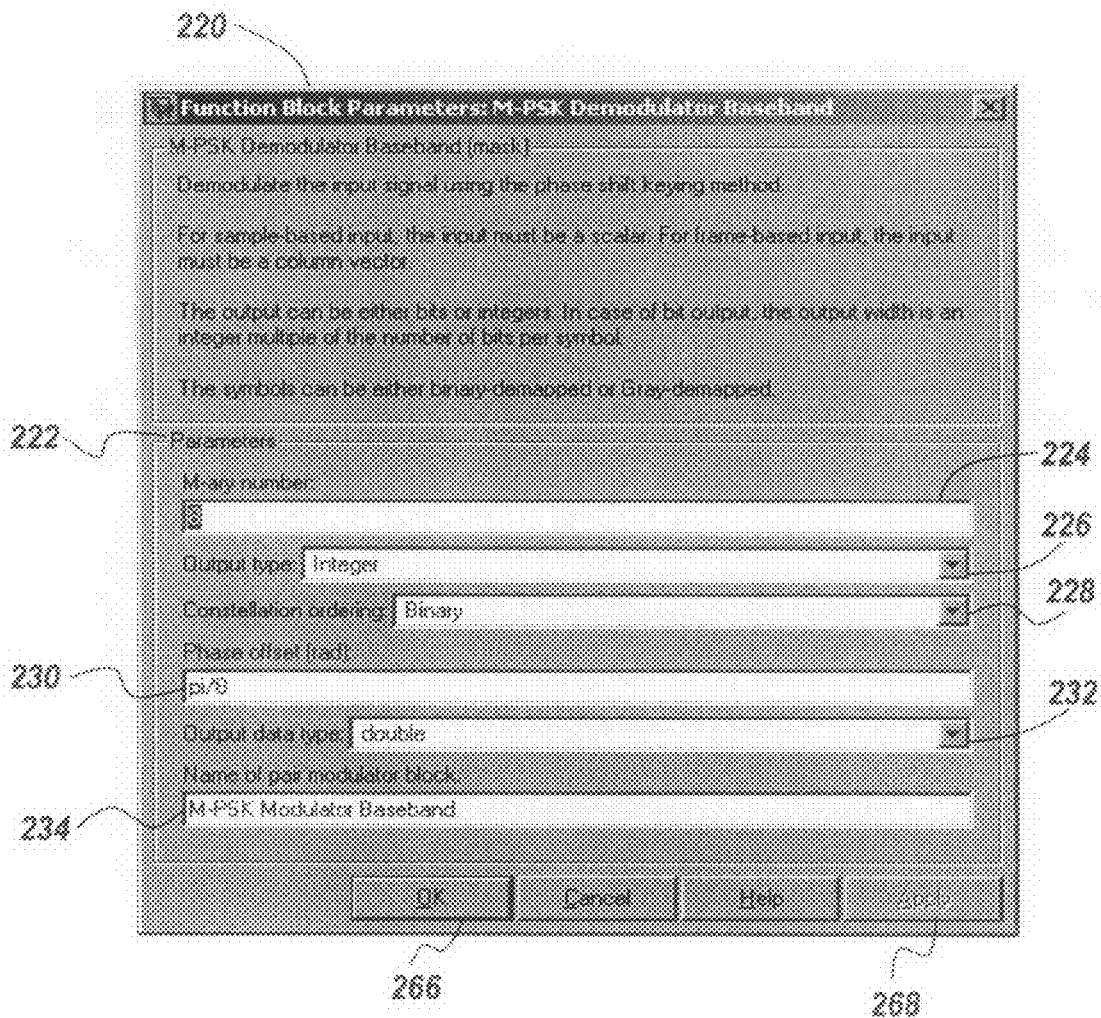
FIG. 2B illustrates an exemplary graphical user interface that may be used by a user to specify an identity of an associated modulator.

FIG. 2B shows a parameters dialog 220 for the demodulator block 110 in FIG. 1. The parameter dialog 220 allows a user to get a number of parameters for demodulator block 110. The user-settable isolated parameters are defined in parameters list 222. Parameter list 222 includes an M-ary parameter 224 that represents the number of points in the signal constellation, an input type parameter 226 that indicates if the input consists of integers or groups of bits, a constellation ordering parameter 228 that indicates how the block maps groups of bits to a corresponding point in the complex plane, a phase offset parameter 230 that defines the phase of the zeroth point of the signal constellation, and an output data type parameter 232 that specifies the output data type of the demodulator block 110.

The parameters dialog 220 also, includes a text box 234 in which a user may provide identity information (e.g., a name) for a corresponding modulator block. In this example, the user has typed in the name of "M-PSK Modulator Baseband" in the text box 234 as the corresponding modulator block. As will be described in more detail below, once the user has entered the name of the corresponding modulator block and selected the "OK" button 266 or the "Apply" button 268, the isolated parameters between the modulator block 106 and the demodulator block 110 are checked for consistency. This check may be performed upon selecting the "OK" or "Apply" button or at a later time, for example, when a model is processed before execution.

In one embodiment, a user interface (not shown) may be provided to allow a user to specify what isolated parameters are to be consistently checked between the two graphical modeling components. Additionally, when a first block is indicated to be paired with a second block, the first and second block may both show the pairing.

In FIG. 2B, the phase offset parameter 230 has a value of pi/8 whereas the corresponding phase offset parameter 260 (FIG. 2A) has a value of pi/4. In an embodiment, a demodulator block and its corresponding modulator block may need to have the same value for their respective phase offset parameters. In other words, the phase offset parameter of a demodulator block may need to match the phase offset parameter of a modulator block for there to be consistency between the two blocks.

Figure 2C:
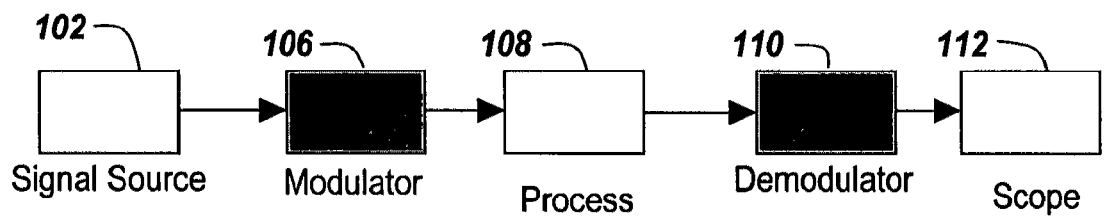
FIG. 2C illustrates an exemplary error message that can be displayed when related user-settable isolated parameters are not within a determined range.

Still referring to FIG. 2B, when consistency checking is performed between the user-settable isolated parameters of block 106 and user-settable isolated parameters of block 110, an inconsistency is detected because the value for the phase offset parameter 260 (FIG. 2A) of block 106 is not consistent (i.e. equal in this case) with the phase offset parameter 230 (FIG. 2B) of block 110. When this happens, an error message may be displayed in model 100. For example, FIG. 2C shows an exemplary error message "Error! Phase offset values are not consistent between M-PSK Modulator Baseband block and M-PSK Demodulator. Baseband block" that is displayed in model 100. In one embodiment, graphical modeling components that should have consistent user-settable isolated parameters are highlighted when one or more pairs of user-settable isolated parameters are not consistent. In the context of the present invention, a pair of user settable isolated parameters consists of an isolated parameter for one component or block and its corresponding isolated parameter for another component or block. For example, FIG. 2C shows that modulator block 106 and demodulator block 110 are highlighted because their phase offset parameter values are not consistent with one another.

FIGS. 2A and B use block names to identify associated blocks. In other embodiments, other mechanisms (e.g., tags) can be used to identify associated blocks. For example, a first tag and a second tag can be created and assigned to related graphical modeling components, such as a sending component and a receiving component. The tags can be attributes of the components, where the purpose of the tags is to establish association between the components. The tags can specify that a certain subset of isolated parameters must be consistent between the associated blocks, or that all the isolated parameters must be consistent. An example illustrating the use of tags is discussed below with FIGS. 3, 4A and 4B.

Figure 3:
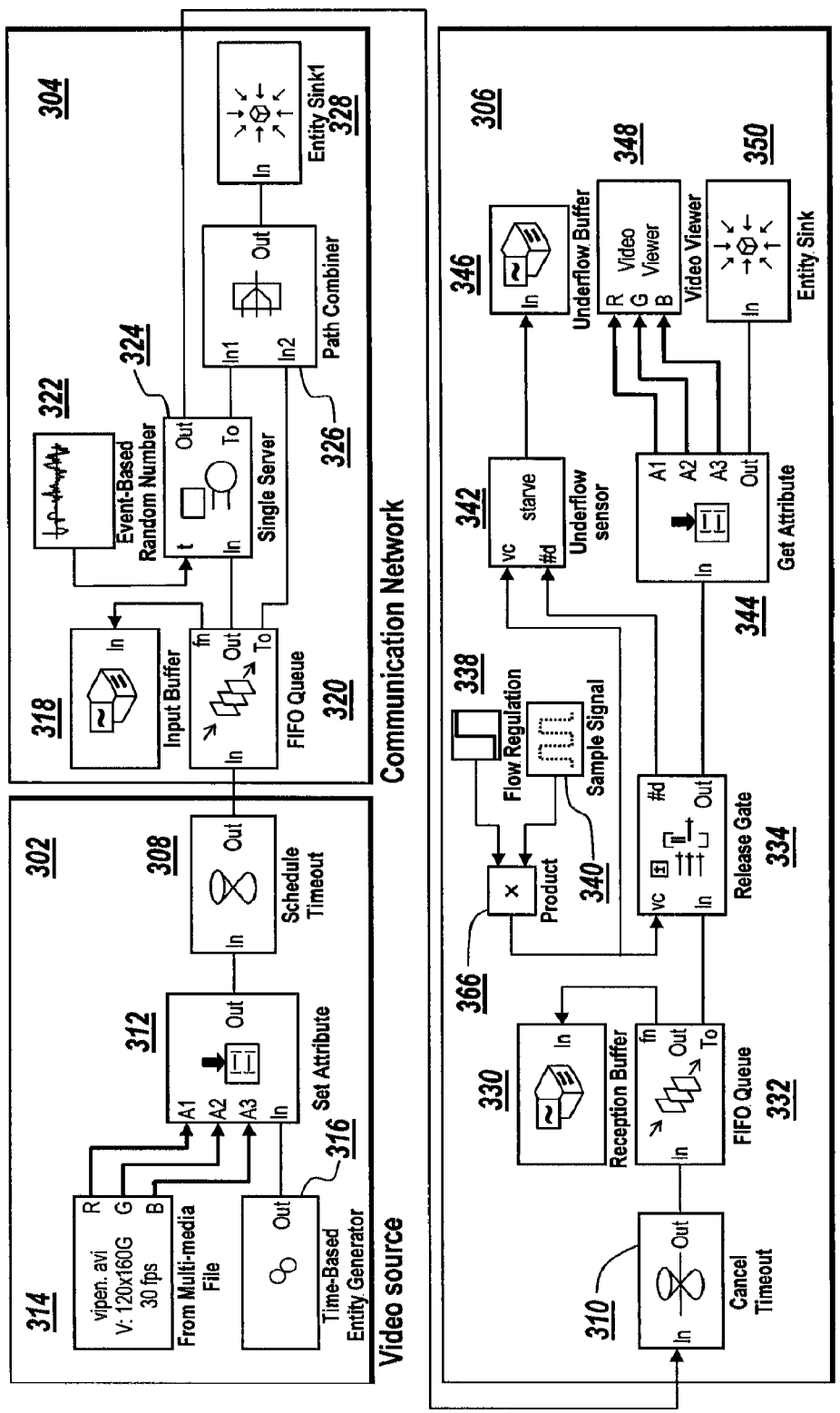
FIG. 3 depicts an exemplary model in an entity-based modeling environment that may be used to practice an exemplary embodiment.

FIG. 3 shows a discrete event model 300 divided into regions 302, 304 and 306 that simulates an application where video frames are sent via a communication network and replayed by the end-user. In the example of FIG. 3, the discrete event model 300 is a model created using SimEvents® software from The MathWorks, Inc. In such a model, an "entity" represents an item of interest. For the case shown, the entities represent video frames. Region 302 models the source of the video, such as a web server. Region 304 models an exemplary communication network that captures first-in-first-out (FIFO) behavior and the random delay a frame may experience when the frame travels via the network. Region 306 models video-playing software that includes a buffering mechanism to reduce the occurrence of an under-flow event (i.e., the event that a frame is needed but is not available) to obtain a high-quality playback.

Region 302 includes a "From Multi-media File" block 314 that models a video source, a "Time-Based Entity Generator" block 316 that generates entities that represent video frames, a "Set Attribute" block 312 that sets the attributes of an entity, and a "Schedule Timeout" block 308 that models the Time-Of-Life (TOL) of a video frame. The Schedule Timeout block 308 creates a timeout tag for each video frame (assumes TOL=1 second) before the video frame is sent to the communication network represented by region 304.

Region 304 includes a "FIFO Queue" block 320 that stores received entities in sequence for an undetermined time period. Region 304 also includes an "Input Buffer" block 318 that plots the number of entities in the queue as a function of time. Region 304 further includes a "Single Server" block 324 that serves received entity one at a time and an "Event-Based Random Number" block 322 that obtains a number each time the "Single Server" block 324 receives an entity.

Region 304 also includes a "Path Combiner" block 326 that groups timed-out entities from the "FIFO. Queue" block 320 and "Single Server" block 324 to output the entities one by one to an "Entity Sink1" block 328. If a frame experiences heavy delay that causes the TOL to expire, then the frame is sent by either the "FIFO. Queue" block 320 or the "Single Server" block 324 to be discarded by the "Path Combiner" block 326.

Region 306 includes a "Cancel Timeout" block that removes the timeout tag for each received entity. For example, when a video frame arrives at the receiver (i.e. the video playing software in region 306) in a timely fashion, the Cancel Timeout block 310 in region 306 cancels the timeout service by removing the timeout tag that is created by the Schedule Timeout block 308.

Region 306 can further include a "FIFO Queue" block 332 that stores the entities in sequence for an undetermined period of time, and a "Reception Buffer" block 330 that plots the number of entities in the queue of "FIFO Queue" block 332 as a function of time. Region 306 further includes a "Release Gate" block 334 that permits one entity to enter when an event occurs, where the event is generated by using the "Product" block 336 to multiply one or more step functions generated by "Flow Regulation" block 338 with a signal provided by "Sample Signal" block 340. Region 306 also includes an "Underflow sensor" block 342 and an "Underflow Event" block 346 that plots the number of underflow events as a function of time. Region 306 further includes a "Get Attribute" block 334 that outputS the value of attributes to a "Video Viewer" block 348 that displays the video frames. Region 306 also includes an "Entity Sink" block 350 that terminates the paths of the entities.

Using the Schedule Timeout block 308 and Cancel Timeout block 310, a user can model a section of a system that has timing requirements. Exemplary systems that have timing requirements include, but are not limited to, real-time operating systems, communication networks, inventory systems, supply-chains, and business processes.

Figure 4A:
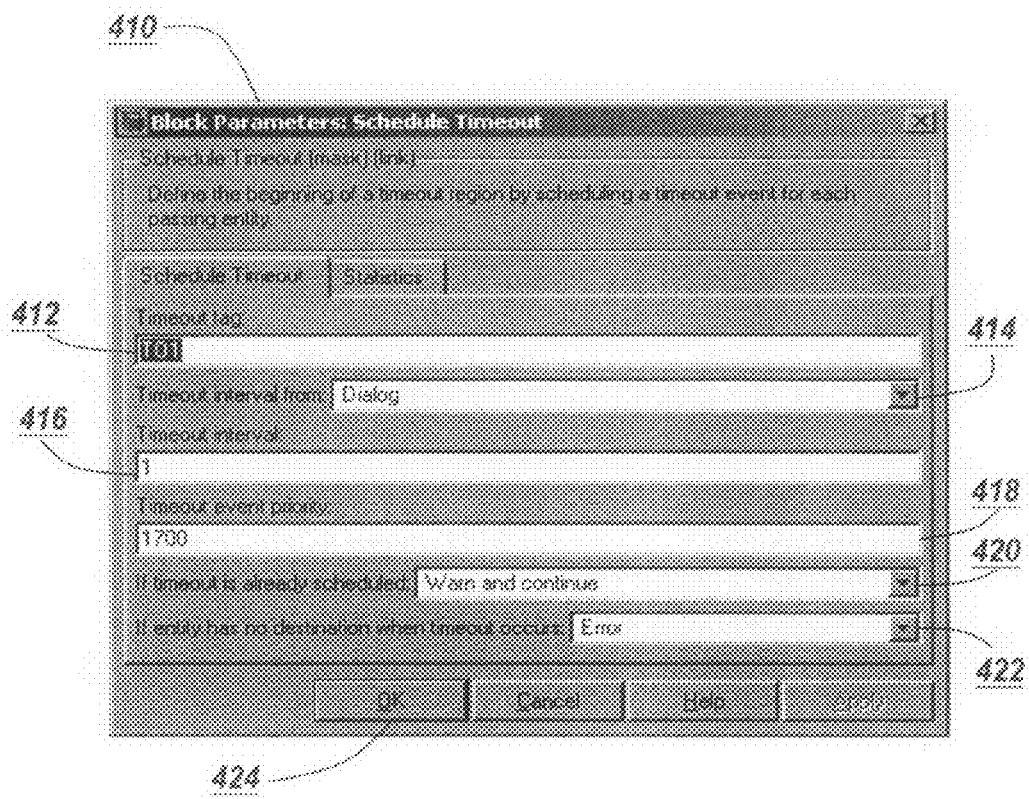
FIGS. 4A-B illustrates an exemplary graphical user interface that may be used to specify an identity of a block.

FIG. 4A illustrates a graphical user interface 410 that includes a timeout tag field 412 and a drop-down list 414 for specifying where the timeout interval is obtained. Graphical user interface 410 further includes timeout interval field 416 and timeout event priority field 418. Graphical user interface 410 also includes drop-down list 420 for selecting an action when a timeout is already scheduled and a drop-down list 422 for selecting an action when an entity has no destination when timeout occurs. In timeout tag field 412, a timeout tag with name "TO1" is specified. A timeout with tag "TO1" is created for each video frame sent by video source that is modeled by region 302.

When the video frame reaches the receiver in region 306, a timeout with tag "TO1" needs to be removed by the Cancel Timeout block 310. In order to remove the timeout with the correct tag, the identity of timeout with tag "TO1" is needed. Instead of providing the identity of timeout with tag "TO1" directly to Cancel Timeout block 310, the corresponding Schedule Timeout block may be identified. Hence, if the timeout tag in the Schedule Timeout block is changed, a user does not need to also change the identity of the timeout tag in the corresponding Cancel Timeout block.

Figure 4B:
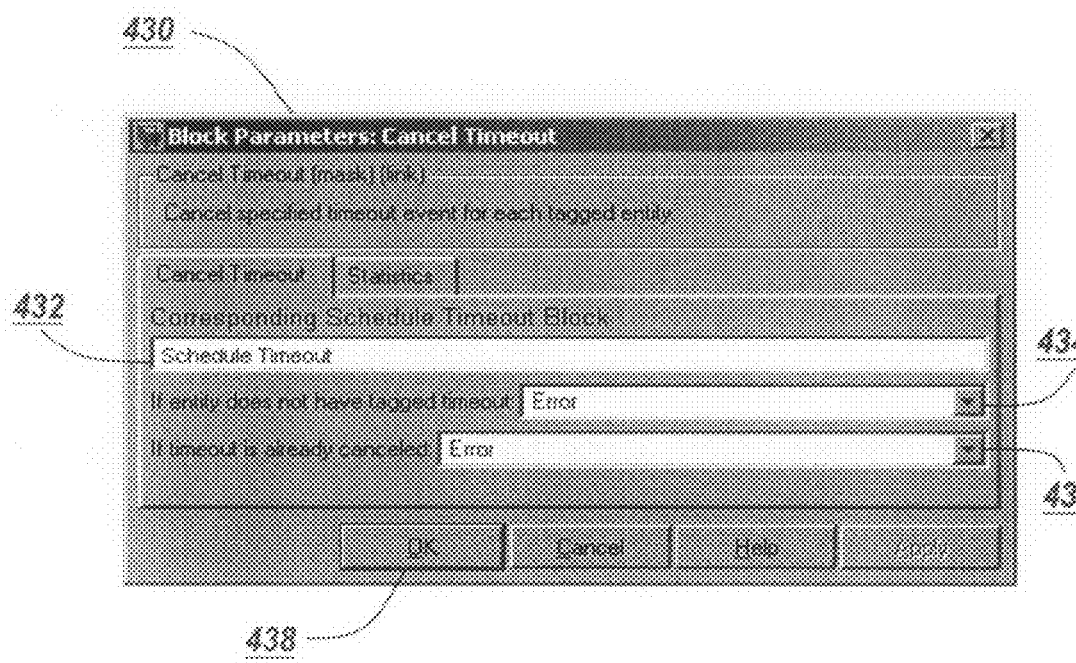

FIG. 4B illustrates an exemplary graphical user interface that may be used for Cancel Timeout block 310 to identify the corresponding Schedule Timeout block. FIG. 4B shows a graphical user interface 430 that includes a corresponding schedule timeout block field 432, a drop-down list 434 for selecting an action when an entity does not have a tagged timeout, and a drop-down list 436 for selecting an action when a timeout is already canceled. In corresponding schedule timeout block field 432, a block name "Schedule Timeout" is specified to indicate that block 402 is the corresponding block for the Cancel Timeout block 310.

In one embodiment, a dialog may change depending upon the attributes that are assigned to an entity, e.g. by a paired block. For example, if an entity has two time outs assigned, the entities may appear in a drop-down list so that a user can select an entity to be cancelled. The drop-down list may be automatically populated. Similarly, radio buttons, check boxes and the like may be dynamically shown, for example, depending upon the characteristics of the paired block.

Figure 5A:
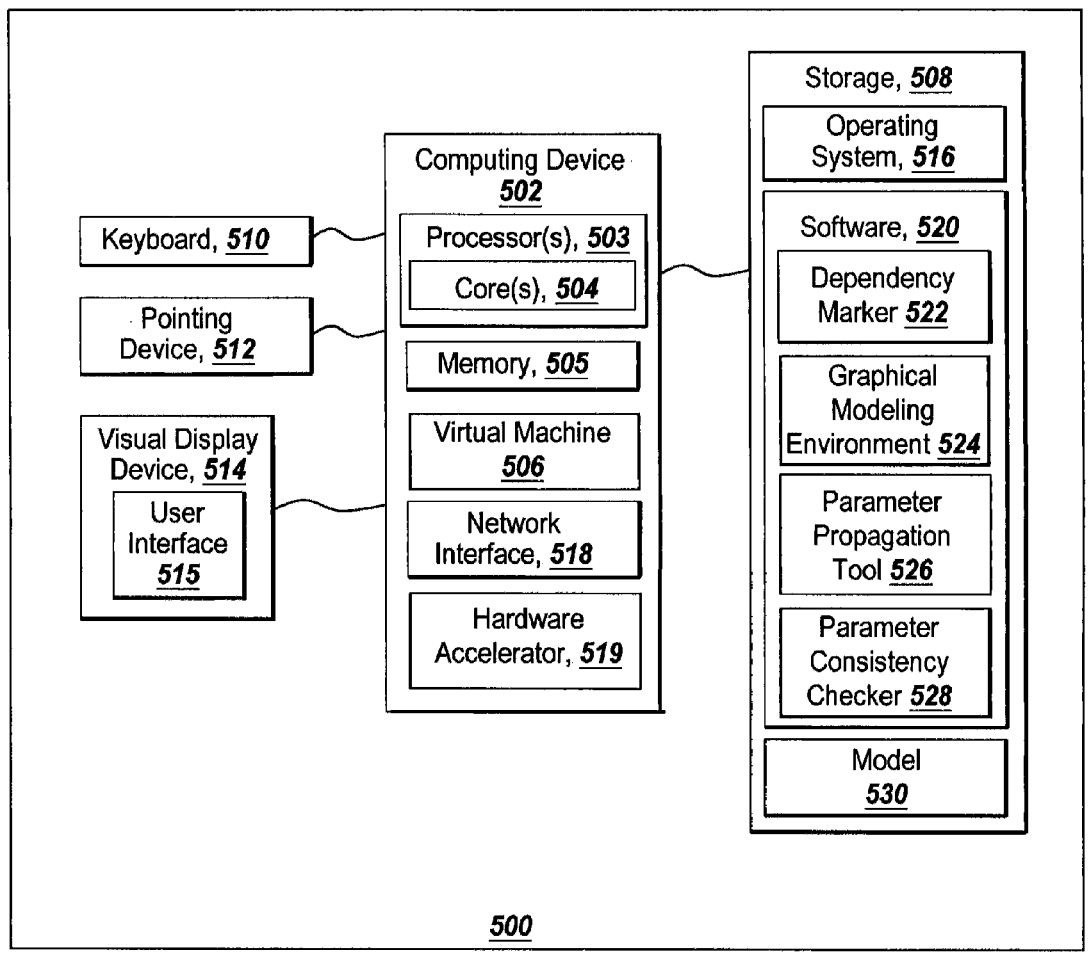
FIG. 5A is a block diagram of a computing device/environment suitable for practicing one or more exemplary embodiments.

FIG. 5A depicts an example of a computing environment 500 suitable for practicing exemplary embodiments. The computing environment 500 includes a computing device 502. The computing device 502 may be any computer device and/or system, such as a workstation, desktop computer, server, laptop, handheld computer or other form of computing or telecommunications device that is capable of communication with another device/system and that has sufficient processor power and/or memory to perform the operations described herein. The computing device 502 includes processor 503, which may be a single processor or multiple processors. Processor 503 may be a single or multiple core 504 processor.

The computing device 502 also includes memory 505 to store software. The memory 505 may include among other things a computer system memory or random access memory (RAM), such as dynamic random access memory (DRAM), static random access memory (SRAM), extended data out random access memory (EDO RAM), magnetoresistive random access memory (MRAM), etc.

The network interface 518 may include a built-in network adapter, network interface card (MC), Personal Computer Memory Card International Association (PCMCIA) network card, card bus network adapter, wireless network adapter, Universal Serial Bus (USB) network adapter, modem or any other device suitable for interfacing the computing device 502 to any type of network capable of communication and performing operations described herein.

Virtualization can be employed in computing device 502 so that infrastructure and/or resources in the computing device 502 can be utilized independent of the hardware upon which they are operating. Virtualized processors may also be used with software 520 and/or other software in storage 508. A virtual machine 506 can be provided to handle a process running on multiple processors so that the multiple resources appear as one logical resource. Multiple virtual machines can also be used with one processor.

Other computing resources, such as Field Programming Gate Array (FPGA), Application Specific Integrated Circuit (ASIC), Application Specific Instruction Processor (ASIP), Digital Signal Processor (DSP), and General Purpose Processor (GPP), may also be used for executing code and/or software and a Graphics Processing Unit (GPU) may also be utilized. A hardware accelerator 519, such as implemented in an ASIC, FPGA, or the like, can additionally be used to increase a processing rate of the computing device 502.

The computing device 502 may include I/O devices, such as a keyboard 510 and a pointing device 512 (e.g. a mouse), for receiving input from a user. Other input devices such as motion-based devices, touch screens, cameras, and microphones may also be used. The computing device 502 may also include a visual display device 514, such as a computer monitor, which may display a user interface 515.

The computing device 502 may further include a storage device 508, such as a hard-drive, compact disc-read-only memory (CD-ROM), or other computer readable medium, for storing an operating system 516 and other related software, and for storing graphical modeling environment 524, such as a SIMULINK modeling environment. One of ordinary skill in the art will appreciate that computer readable medium is not limited to secondary storage.

Software 520 includes the graphical modeling environment 524 that enables a user to create an executable graphical model 530, such as a SIMULINK-compatible model, that may be stored in storage 508. Although model 530 is illustrated in FIG. 5A as being stored independently of software 520, one of ordinary skill in the art will appreciate that model 530 may be included as part of software 520. Software 520 also includes dependency marker 522 that identifies for a graphical modeling component the identity of its associated graphical modeling component(s). For example, the dependency marker 522 may identify the demodulator block 110 as the associated graphical modeling component of the modulator block 106. In one embodiment, the dependency marker 522 may let a user specify in a graphical modeling component the identity of an associated graphical modeling component where all the common user-settable isolated parameters between the two components should be consistent. In one embodiment, each graphical modeling component may store the identity of its associated graphical modeling component(s), if any, as a value for one of its user-settable isolated parameters.

In one embodiment, the graphical modeling component and its associated graphical modeling component(s) may be different kinds of graphical modeling components, such as a modulator and an associated demodulator, an encoder and an associated decoder, an interleaver and an associated deinterleaver, or a transmitter and an associated receiver. In another embodiment, the graphical modeling component and its associated graphical modeling component(s) may also be different instances of the same pre-defined graphical modeling component in a library or a user-defined graphical modeling component, such as a transmitter and another associated transmitter.

The dependency marker 522 identifies user-settable isolated parameters of a graphical modeling component to which a consistency check will be applied. Software 520 further includes parameter consistency checker 528 that checks the consistency of user-settable isolated parameter(s) of the graphical modeling component with user-settable isolated parameter(s) of the associated graphical modeling component(s). For example, the parameter consistency checker 528 may check the consistency of the user-settable isolated parameters identified by the dependency marker for the modulator block 106 and its associated demodulator block 110.

Software 520 may also include parameter propagation tool 526. The parameter propagation tool 526 may change a user-settable isolated parameter in a graphical modeling component in response to changes in a user-settable isolated parameter in an associated graphical modeling component. For example, in response to a change made to a user-settable isolated parameter in the demodulator block 110, the parameter propagation tool 526 may change a user-settable isolated parameter in the modulator block 106. In one embodiment, parameter propagation tool 526 propagates a new value of a common user-settable isolated parameter from one graphical modeling component to another graphical modeling component that contains an old value of the common user-settable isolated parameter.

Dependency marker 522, parameter propagation tool 526, and parameter consistency checker 528 can be adapted to be included as part of the software 520, or they can each or in combination be a stand-alone application, module, script, plug-in, or program that responds to calls from the software 520. Functionalities provided by dependency marker 522, parameter propagation tool 526, and parameter consistency checker 528 can be grouped or separated in other ways than what is illustrated herein.

The computing device 502 can be running an operating system 516 such as a version of the Microsoft® Windows® operating systems, UNIX operating system, Linux operating systems, MacOS® operating system, etc. Implementations of computing device 502 may further operate an embedded operating system, a real-time operating system, an open source operating system, a proprietary operating system, an operating system for mobile computing devices, and/or another type of operating system capable of running on computing device 502 and/or performing the operations described herein.

Figure 5B:
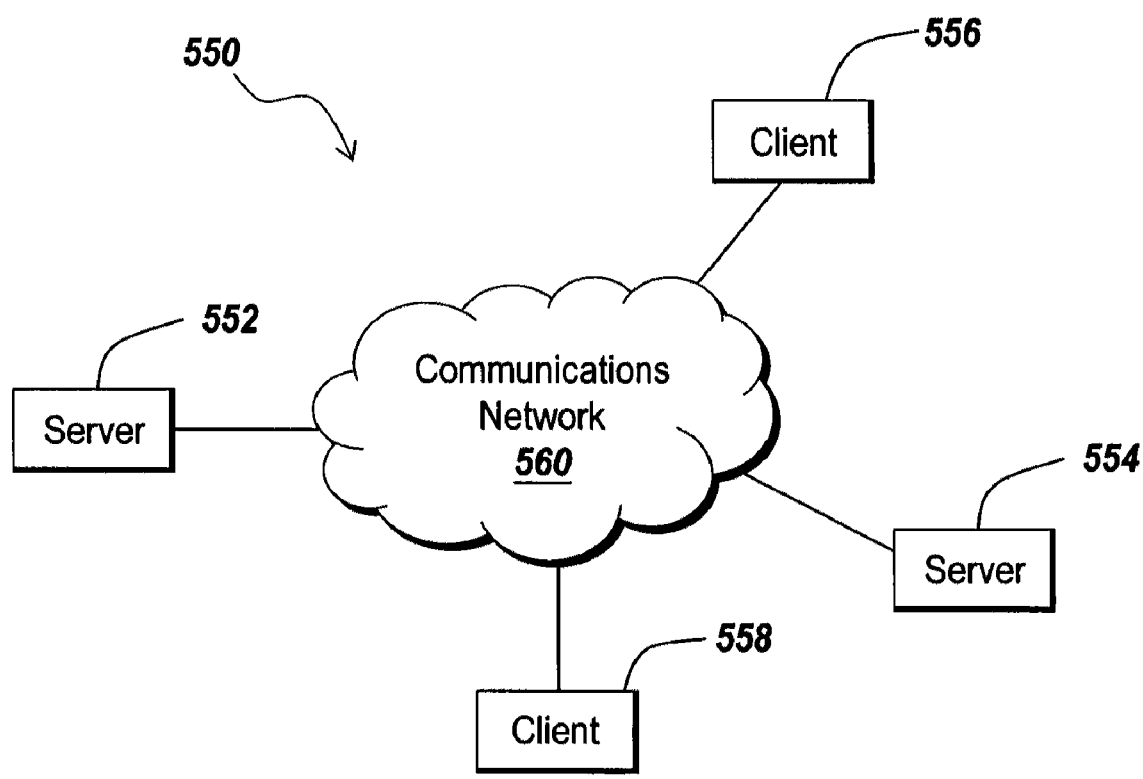
FIG. 5B depicts an exemplary distributed system suitable for practicing a distributed implementation of an exemplary embodiment.

FIG. 5B is an exemplary network environment 550 suitable for a distributed implementation of an exemplary embodiment. The network environment 550 may include one or more servers 552 and 554 coupled to clients 556 and 558 via a communication network 560. In one implementation, the servers 552 and 554 and/or the clients 556 and/or 558 can be implemented via the computing device 502. The network interface 518 of the computing device 502 enables the servers 552 and 554 to communicate with the clients 556 and 558 through the communication network 560. The communication network 560 may include the Internet, an intranet, a LAN (Local Area Network), a WAN (Wide Area Network), a MAN (Metropolitan Area Network), a wireless network (e.g., using IEEE 802.11, IEEE 802.16, or Bluetooth), etc. In addition the network may use middleware, such as CORBA (Common Object Request Broker Architecture) or DCOM (Distributed Component Object Model) to allow a computing device on the network 560 to communicate directly with another computing device that is connected to the network 560.

Figure 6:
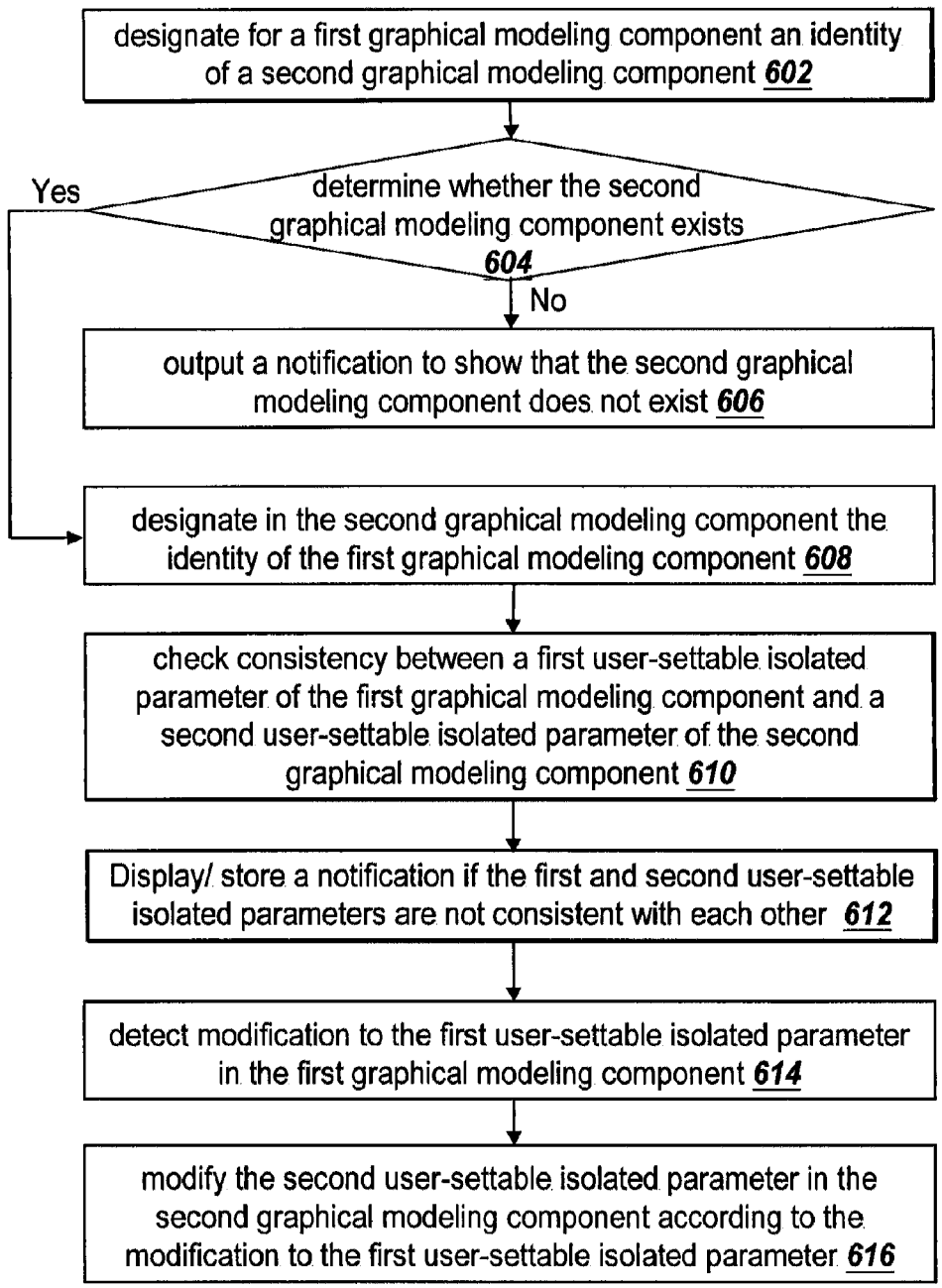
FIG. 6 illustrates a flow chart depicting exemplary processing that can be used to implement an exemplary embodiment.

FIG. 6 illustrates a flow chart depicting exemplary processing to perform consistency checking of user-settable isolated parameters between graphical modeling components in a graphical model. In step 602, an identity of a second graphical modeling component is designated at the model component level as related to a first graphical modeling component. The identity of the second graphical modeling component can refer to an identification number, name, or any other unique information that can be used to identify the second graphical modeling component. In one embodiment, the first graphical modeling component has a user-settable isolated parameter that stores the identity of its associated graphical modeling component(s). A graphical user interface can be provided to allow a user to designate the identity of the associated graphical component(s) (i.e., the second graphical modeling component in this case). The identity of the associated graphical element(s) is then used as the value of a user-settable isolated parameter that stores the identity of the associated graphical modeling component(s). In one embodiment, the first graphical modeling component and the second graphical modeling component are always used together in the graphical modeling environment 524.

The related components may be located in different parts of a model hierarchy. For example, a model component that represents an analog to digital converter (ADC) may be present in a model, with a subsystem at the same level of hierarchy that contains a model component that represents a digital to analog converter (DAC) that is related to the ADC. As such, the ADC and DAC are in different parts of the model hierarchy. This hierarchical structure may be only for graphical purposes and not affect the execution because of being flattened when the model is prepared for execution, or the hierarchical structure may affect the execution, for example by corresponding to a hierarchy of sorted lists.

In one embodiment the components may appear in state transition diagrams. Two states in a state diagram may be related by means of a consistency relation that requires that the number of equations for the 'during the behavior' of a state to be the same for the related states. Alternatively, two transitions in a state diagram may be related by a requirement that the comparison value of an inequality is the same or that the inequalities are opposite (one larger than and the other less than).

In one embodiment, the user may provide the consistency rules. The consistency rules may be specified textually, for example as M code, or in a constraint language. The consistency rules may be entered textually and linked through a call back, for example, or, alternatively, a graphical environment may be made available, for example from a button on a block dialog, to enter consistency relations graphically.

In step 604, software 520 determines whether the second graphical modeling component exists by using the identity information. In one embodiment, the provided identity information may be used at compile time to determine whether the second graphical modeling component exists in the model. For example, when a user uses a keyboard to type "Ctrl+D" to compile a SIMULINK model in a SIMULINK-compatible application, software 520 finds that a first block has the identity information of its corresponding block (i.e., the second model component). Software 520 then determines whether there is a graphical modeling component in the model with an identity that matches the identify information found in the first block. If software 520 cannot find a graphical modeling component with an identity that matches the identify information, software 520 may output a notification message, which may be an error message, warning, etc., in step 606 to show that the identified graphical modeling component with the identity information does not exist. For example, assume a user entered "ABC demodulator" as the name that identifies the graphical modeling component that corresponds to a modulator component with the name "M-PSK Modulator Baseband" in model X. In this case, the error message may display "ABC demodulator" cannot be found in model X: "Error! 'ABC demodulator' cannot be found." Alternatively, if the block cannot be found, the problem may be silently resolved by ignoring the relation.

If the second graphical modeling component exists in step 604, then dependency marker 522 may optionally designate for the second graphical modeling component the identity of the first graphical modeling component in step 608. As such, not only the first graphical modeling component knows that its user-settable isolated parameters depends on the second graphical modeling component, the second graphical modeling component also knows that its user-settable isolated parameter depends on the first graphical modeling component. Alternatively, only one of the associated graphical modeling components may indicate the dependency. Once the second graphical modeling component is found, parameter consistency checker 528 can check the consistency between a first user-settable isolated parameter of the first graphical modeling component and a second user-settable isolated parameter of the second graphical modeling component in step 610. In one embodiment, this consistency checking of parameters is performed based on the designation at the model component level that the components are related. It will be appreciated that if the modeling components are operated in different modes they may not display like parameters and so the mode of the modeling component needs to be identified before the checking of parameters for consistency takes place. It should be appreciated that the illustrated sequence in FIG. 6 is recited for illustrative purposes and other sequences composed of the same or different steps are also within the scope of the present invention.

In one embodiment, the first user-settable isolated parameter is consistent with the second user-settable isolated parameter when they have the same value. In another embodiment, the first user-settable isolated parameter is consistent with the second user-settable isolated parameter when they satisfy a known fixed relationship, such as the value of the first user-settable isolated parameter being smaller than the value of the second user-settable isolated parameter. For example, given a graphical model of a network system, the bandwidth of a household router may always be smaller than the bandwidth of its LAN network. In one embodiment, each group of to related user-settable isolated parameters may have its own definition for consistency. Parameter consistency checker 528 may store the definition of consistency for each group of related user-settable isolated parameters, such as in a database or lookup table, and may retrieve the corresponding definition when checker 528 needs to check the consistency of a specific group of user-settable isolated parameters. In step 612, a notification of a consistency status between the first user-settable isolated parameter and the second user-settable isolated parameter may be displayed. For example, an error notification or warning notification may be displayed if the first user-settable isolated parameter and the second user-settable isolated parameter are not consistent with each other or alternatively a message may be displayed indicating that the first and second user-settable isolated parameters are in fact consistent.

In step 614, parameter consistency checker 528 may optionally detect modification to the first user-settable isolated parameter in the first graphical modeling component. If the first user-settable isolated parameter has changed, the first user-settable isolated parameter and the second user-settable isolated parameter may no longer be consistent with one another. In step 616, parameter propagation tool 526 may then optionally modify the second user-settable isolated parameter in the second graphical modeling component to make the first user-settable isolated parameter and the second user-settable isolated parameter consistent with one another. In other words, when a first user-settable isolated parameter is changed in the first graphical modeling component, the first graphical modeling component can then be treated as a source block and the second graphical modeling component can be treated as a destination block. The first user-settable isolated parameter may be propagated to the second user-settable isolated parameter in this case. As such, the consistency between the first user-settable isolated parameter and the second user-settable isolated parameter can be maintained. Additional techniques to determine consistent values may also be employed without departing from the scope of the present invention.

One of ordinary skill in the art will also appreciate that the present invention is not limited to using the graphical user interface illustrated in FIGS. 2A-B and 4A-B and other kinds of graphical user interface or a text-based interface may also be used to practice the present invention. The illustrated embodiments in FIGS. 1A to 6 are merely used herein as an example to allow better understanding of the spirit of the present invention. For example, a directive can be used in text to indicate that a function is to be related to another function, for example by having the same argument list, or by having the same data type for variables of the same name in the argument list, by running in the same thread or in a different thread, or by having a call site in the same function, etc. It will be appreciated that these relations may also be captured in a graphical modeling environment such as UML and are not restricted to a textual implementation.

In one embodiment, the isolated parameters being checked for consistency between two graphical modeling components may be may be the conditions for enabling two enabled subsystems that should be mutually enabled. In another embodiment, the isolated parameters being checked for consistency between two graphical modeling components may be the number of bits for bit-encoding and bit-decoding blocks (e.g., for a controller area network (CAN) bus connection). In one embodiment, the isolated parameters being checked for consistency between two graphical modeling components may be amplification factors of models of signal conditioning hardware to amplify up and down electrical signals In an embodiment, the isolated parameters being checked for consistency between two graphical modeling components may be identification parameters of model components that access functionality of a hardware device to be identified, e.g., the time base and trigger level of an oscilloscope.

In one embodiment, C, C++ or Hardware Description Language (HDL) code may be generated from the graphical model. The generation code may serve as "validation code" and be used to show the consistency/non-consistency of the relationships between modeling components.

Graphical modeling environments that may be used to develop and/or execute a graphical model in accordance with exemplary embodiments include, but are not limited to the Simulink® modeling environment from The MathWorks, Inc. of Natick, Mass., LabVIEW® or MATRIXx from National Instruments, Inc., SoftWIRE by Measurement Computing, VisSim by Visual Solutions, WiT by DALSA Coreco, VEE Pro by Agilent, Dymola from Dynasim AB, Extend from Imagine That, Inc., Scicos from The French National Institution for Research in Computer Science and Control (INRIA), MSC.Adams® from MSC.Software Corporation, Rhapsody® from iLogix, Inc., Rational® from International Business Machines Corporation, ARTiSAN Studio from ARTiSAN Software Tools, Inc., SCADE™ from Esterel Technologies, Inc., among others.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

We claim:

1. A computing device-implemented method for checking consistency of user-settable isolated parameters among a first graphical modeling component and a second graphical modeling component in an executable graphical model, said method comprising:

receiving a user designation at the model component level that the first graphical modeling component and the second graphical modeling component are related, at least one of the first graphical modeling component and the second graphical modeling component being a block or connection in an executable block diagram, where the first graphical modeling component is an encoder component for encoding a signal and the second graphical modeling component is a decoder component for decoding the signal;

checking consistency between a first user-settable isolated parameter of the first graphical modeling component and a second user-settable isolated parameter of the second graphical modeling component based on the designating of the first graphical modeling component and the second graphical modeling component as related; and displaying a notification, or storing a determination, regarding a consistency status of the first user-settable isolated parameter and the second user-settable isolated parameter.

2. The method of claim 1, wherein the first user-settable isolated parameter is one of complexity, data type, or dimensionality.

3. The method of claim 1, wherein the first user-settable isolated parameter is one of a sample time or a frame rate of the first graphical modeling component.

4. The method of claim 1, wherein the first user-settable isolated parameter is consistent with the second user-settable isolated parameter when the first user-settable isolated parameter and the second user-settable isolated parameter satisfy a relationship.

5. The method of claim 1, further comprising:

detecting an inconsistency in the first user-settable isolated parameter in the first graphical modeling component; and modifying the second user-settable isolated parameter in the second graphical modeling component based on the modification to the first user-settable isolated parameter so that the second user-settable isolated parameter stays consistent with the first user-settable isolated parameter.

6. The method of claim 1, further comprising:

generating a report including information regarding consistency status of the related first modeling component and the second modeling component.

7. The method of claim 1, further comprising:

receiving a user designation through a user interface.

8. The method of claim 7 wherein a plurality of components are designated as being related.

9. A computer system for checking consistency of user-settable isolated parameters among graphical modeling components in an executable graphical model, said system comprising:

an executable graphical model including a first graphical modeling component and a second graphical modeling component, wherein the first graphical modeling component and the second graphical modeling component are designated at the model component level by a user as being related, at least one of the first graphical modeling component and the second graphical modeling component being a block or connection in an executable block diagram, where the first graphical modeling component is an encoder component for encoding a signal and the second graphical modeling component is a decoder component for decoding the signal;

a parameter consistency checker that checks consistency between a first user-settable isolated parameter of the first graphical modeling component and a second user-settable isolated parameter of the second graphical modeling component; and an interface that displays a notification of a consistency status to a user or that sends a consistency status notification to a destination or to a storage device.

10. The system of claim 9, wherein the executable graphical model further includes a third graphical modeling component that is related to the first and second graphical modeling components, and wherein the parameter consistency checker checks the consistency of a third user-settable isolated parameter of the third graphical modeling component with respect to the first and second user-settable isolated parameters.

11. The system of claim 9, further comprising:
a dependency marker that designates that the first graphical modeling component and the second graphical modeling component are related.

12. The system of claim 9, further comprising:
a parameter propagation tool that modifies the second user-settable isolated parameter in the second graphical modeling component according to a modification to the first user-settable isolated parameter so that the second user-settable isolated parameter is consistent with the first user-settable isolated parameter.

13. A non-transitory computer-readable medium storing executable instructions for determining consistency of user-settable isolated parameters among a first graphical modeling component and a second graphical modeling component in an executable graphical model, the instructions when executed causing at least one computing device to:
receive a user designation at the model component level that the first graphical modeling component and the second graphical modeling component are related, at least one of the first graphical modeling component and the second graphical modeling component being a block or connection in an executable block diagram, where the first graphical modeling component is an encoder component for encoding a signal and the second graphical modeling component is a decoder component for decoding the signal;
check consistency between a first user-settable isolated parameter of the first graphical modeling component and a second user-settable isolated parameter of the second graphical modeling component based on the designating of the first graphical modeling component and the second graphical modeling component as related; and
display a notification, or storing a determination, regarding a consistency status of the first user-settable isolated parameter and the second user-settable isolated parameter.

14. The medium of claim 13, wherein the first graphical modeling component is of a first type and the second graphical modeling component is of a second type that differs from the first type.

15. The medium of claim 13, wherein the first graphical modeling component and the second graphical modeling component are designated for the checking in response to input from a user.

16. The medium of claim 13, wherein the instructions when executed further cause the at least one computing device to:
detect an inconsistency to the first user-settable isolated parameter in the first graphical modeling component; and
modify the second user-settable isolated parameter in the second graphical modeling component according to the modification to the first user-settable isolated parameter so that the second user-settable isolated parameter remains consistent with the first user-settable isolated parameter.

17. The medium of claim 16 wherein the detected inconsistency is a modified isolated parameter and the instructions when executed further cause the at least one computing device to:
derive a consistent isolated parameter for one of the first graphical modeling component and second graphical modeling component based on the modified isolated parameter.

18. The medium of claim 13 wherein the notification is one of an error notification, notification of a consistent status of the first and second user-settable isolated parameters, and warning notification.

19. The medium of claim 13 wherein the instructions when executed further cause the at least one computing device to:
change a user interface for a graphical modeling component based on the user designation at the model component level that the first graphical modeling component and the second graphical modeling component are related, the user interface enabling a user selection of isolated parameters for consistency checking.

20. The medium of claim 19 wherein the user interface being changed is a dialog for a graphical modeling component.

21. A non-transitory computer-readable medium storing executable instructions for determining consistency of user-settable isolated parameters among a first graphical modeling component and a second graphical modeling component in an executable graphical model, the instructions when executed causing at least one computing device to:
receive a user designation at the model component level that the first graphical modeling component and the second graphical modeling component are related, at least one of the first graphical modeling component and the second graphical modeling component being a block or connection in an executable block diagram, where the first graphical modeling component is a modulator component for modulating a signal and the second graphical modeling component is a demodulator component for demodulating the signal;
check consistency between a first user-settable isolated parameter of the first graphical modeling component and a second user-settable isolated parameter of the second graphical modeling component based on the designating of the first graphical modeling component and the second graphical modeling component as related; and
display a notification, or storing a determination, regarding a consistency status of the first user-settable isolated parameter and the second user-settable isolated parameter.

22. A non-transitory computer-readable medium storing executable instructions for determining consistency of user-settable isolated parameters among a first graphical modeling component and a second graphical modeling component in an executable graphical model, the instructions when executed causing at least one computing device to:
receive a user designation at the model component level that the first graphical modeling component and the second graphical modeling component are related, at least one of the first graphical modeling component and the second graphical modeling component being a block or connection in an executable block diagram, where the first graphical modeling component is an interleaver for interleaving signals and the second graphical modeling component is a deinterleaver for deinterleaving signals;
check consistency between a first user-settable isolated parameter of the first graphical modeling component and a second user-settable isolated parameter of the second graphical modeling component based on the designating of the first graphical modeling component and the second graphical modeling component as related; and display a notification, or storing a determination, regarding a consistency status of the first user-settable isolated parameter and the second user-settable isolated parameter.

23. A computing device-implemented method for checking consistency of user-settable isolated parameters among a first graphical modeling component and a second graphical modeling component in an executable graphical model, said method comprising:

receiving a user designation at the model component level that the first graphical modeling component and the second graphical modeling component are related, at least one of the first graphical modeling component and the second graphical modeling component being a block or connection in an executable block diagram, wherein the first graphical modeling component is a modulator component for modulating a signal and the second graphical modeling component is a demodulator component for demodulating the signal;

checking consistency between a first user-settable isolated parameter of the first graphical modeling component and a second user-settable isolated parameter of the second graphical modeling component based on the designating of the first graphical modeling component and the second graphical modeling component as related; and displaying a notification, or storing a determination, regarding a consistency status of the first user-settable isolated parameter and the second user-settable isolated parameter.

24. A computer system for checking consistency of user-settable isolated parameters among graphical modeling components in an executable graphical model, said system comprising:

an executable graphical model including a first graphical modeling component and a second graphical modeling component, wherein the first graphical modeling component and the second graphical modeling component are designated at the model component level by a user as being related, at least one of the first graphical modeling component and the second graphical modeling component being a block or connection in an executable block diagram, wherein the first graphical modeling component is a modulator component for modulating a signal and the second graphical modeling component is a demodulator component for demodulating the signal;

a parameter consistency checker that checks consistency between a first user-settable isolated parameter of the first graphical modeling component and a second user-settable isolated parameter of the second graphical modeling component; and an interface that displays a notification of a consistency status to a user or that sends a consistency status notification to a destination or to a storage device.

25. A computing device-implemented method for checking consistency of user-settable isolated parameters among a first graphical modeling component and a second graphical modeling component in an executable graphical model, said method comprising:

receiving a user designation at the model component level that the first graphical modeling component and the second graphical modeling component are related, at least one of the first graphical modeling component and the second graphical modeling component being a block or connection in an executable block diagram, where the first graphical modeling component is an interleaver for interleaving signals and the second graphical modeling component is a deinterleaver for deinterleaving signals;

checking consistency between a first user-settable isolated parameter of the first graphical modeling component and a second user-settable isolated parameter of the second graphical modeling component based on the designating of the first graphical modeling component and the second graphical modeling component as related; and displaying a notification, or storing a determination, regarding a consistency status of the first user-settable isolated parameter and the second user-settable isolated parameter.

26. A computer system for checking consistency of user-settable isolated parameters among graphical modeling components in an executable graphical model, said system comprising:

an executable graphical model including a first graphical modeling component and a second graphical modeling component, wherein the first graphical modeling component and the second graphical modeling component are designated at the model component level by a user as being related, at least one of the first graphical modeling component and the second graphical modeling component being a block or connection in an executable block diagram where the first graphical modeling component is an interleaver for interleaving signals and the second graphical modeling component is a deinterleaver for deinterleaving signals;

a parameter consistency checker that checks consistency between a first user-settable isolated parameter of the first graphical modeling component and a second user-settable isolated parameter of the second graphical modeling component; and an interface that displays a notification of a consistency status to a user or that sends a consistency status notification to a destination or to a storage device.

* * * * *